United States Patent Office 3,806,493
Patented Apr. 23, 1974

3,806,493
SHAPED ARTICLES COMPOSED OF LINEAR
POLYETHYLENE TEREPHTHALATES
Rolf Wurmb, Heidelberg, Hans-Georg Matthies, Ludwigshafen, Heinz Pohlemann, Limburgerhof, and Joachim Kunde, Frankenthal, Germany, assignors to Badische Anilin- & Soda-Fabrik Aktiengesellschaft, Ludwigshafen, Rhine, Germany
No Drawing. Continuation-in-part of abandoned application Ser. No. 107,493, Jan. 18, 1971. This application June 20, 1973, Ser. No. 371,777
Int. Cl. C08g 17/14
U.S. Cl. 260—49     1 Claim

ABSTRACT OF THE DISCLOSURE

Shaped articles such as filaments, fibers or sheeting composed of linear polyethylene terephthalates containing organic compounds having sulfonate groups. The shaped articles show good affinity for basic dyes.

---

The application is a continuation-in-part of application Ser. No. 107,493 which was filed in the Patent Office on Jan. 18, 1971 and now abandoned.

This invention relates to basic-dyeable shaped articles consisting of linear polyethylene terephthalates, which polyethylene terephthalates are blended with organic compounds containing sulfonate groups.

Filament-forming polyesters are well known and are extensively used, particularly in the textile industry. They are usually prepared from dibasic organic acids or their ester-forming derivatives, particularly of terephthalic acid, and dihydric alcohols, particularly ethylene glycol. Fibers made from polyethylene terephthalate have all desirable properties such as high tensile strength and weather resistance, good texturizability, good recovery and good dimensional stability, except for the drawback that dyeing of such filaments can be carried out virtually only with disperse dyes.

A number of attempts has been made to modify these polyesters, and in particular polyethylene terephthalate, so as to make them basic-dyeable. Thus German published application DAS 1,128,594 discloses a method of modifying polyesters by incorporating difunctional units carrying sulfonate groups into the chemical structure of the polyester so as to impart affinity for basic dyes. However, the known products show a number of disadvantages. Thus polyesters based on polyethylene terephthalate condensed with such sulfonate-group-containing substances have different viscosity characteristics from unmodified polyesters. If, for example, polyethylene terephthalates as produced by the method described in German published application DAS 1,128,594 and unmodified polyethylene terephthalates are adjusted so as to have the same melt viscosities of about 2,000 to 3,000 poises at 275° C., as is normally required for spinning purposes, the modified polyesters have a much lower solution viscosity than the unmodified polyesters, the K values being near 46 instead of 52. This marked depression of the solution viscosity of polyesters chemically modified with sulfonate-group-containing units means a reduction in the quality of the filaments and fibers manufactured from said polyesters, as manifested by an increased tendency to break on folding. Consequently such polyesters are often used as pill-resistant, that is, readily fracturable, fibers. Whereas this property may be useful in some applications, brittleness is a considerable disadvantage for many purposes. Moreover, the cocondensation with sulfonate-group-containing compounds usually leads to products having an increased concentration of diglycol, which is known to adversely affect the properties of the fibers, for example their light stability and melting point.

In addition, U.K. Pat. 1,151,569 discloses methods of admixing sulfonate-group-containing compounds to linear polyesters before spinning. It has been found, however, that the compounds mentioned in this publication do not dissolve in the polyesters and, in particular, do not improve the affinity of the polyesters for basic dyes.

It is an object of the invention to provide shaped articles made from linear polyethylene terephthalates which show good affinity for basic dyes and good mechanical strength.

This object is achieved by shaped articles made from linear polyethylene terephthalates to which are added organic sulfonate-group-containing compounds, the polyethylene terephthalates containing from 0.5 to 6% molar, based on the dicarboxylic acid moiety in the polyethylene terephthalate, of compounds of the General Formula A:

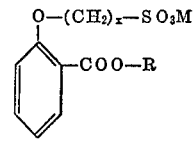

(A)

in which $x$ stands for 3 or 4, M denotes an alkali metal atom, in particular a sodium, potassium or lithium atom, and R stands for straight-chain or branched-chain alkyl of from 1 to 10 carbon atoms optionally substituted by methoxy or ethoxy, or for a cyclohexyl radical.

Suitable polyesters of the invention are linear fiber-forming polyethylene terephthalates containing from 0 to 10% molar of condensed units of other conventional dicarboxylic acids or dialcohols. Preferred polyethylene terephthalates are those containing from 95 to 100% molar of ethylene terephthalate units.

Suitable other dicarboxylic acids are, for example, aliphatic dicarboxylic acids of from 6 to 36, in particular from 6 to 14, carbon atoms, cycloaliphatic dicarboxylic acids of, in particular, from 4 to 6 carbon atoms in the ring, or aromatic dicarboxylic acids having 1 or 2 aromatic rings containing from 8 to 16 carbon atoms. Specific examples of suitable dicarboxylic acids are adipic acid, sebacic acid, dimeric oleic acid, cyclobutane-1,2-dioic acid, 1,4-cyclohexanedioic acid, isophthalic acid, 4,4'-diphenyldioic acid, p,p'-sulfonyldioic acid, p,p'-dicarboxy-diphenylethane, 2,6- and 2,7-naphthalenedioic acids and 2,5-thiophenedioic acid.

Examples of other di-alcohols are glycols of from 4 to 10 carbon atoms such as 1,4-butane diol, 1,6-hexane diol, 1,10-decane diol, neopentyl glycol and 1,4-dihydroxymethylcyclohexane.

The polyesters may contain a number of modifying components in addition to the ethylene terephthalate units.

The polyesters may be manufactured by conventional methods involving the direct esterification of the dicarboxylic acids with the glycols or 1,2-epoxides such as ethylene oxide, or involving transesterification with the aid of catalysts followed by polycondensation in the presence of the usual polycondensation catalysts such as antimony-III-oxide, antimony-III-acetate or germanium compounds.

The preparation of the compounds of Formula A, which is not claimed herein, may be effected, for example, by reacting suitable salicylic acid derivatives with appropriate alkylating agents such as 1,3-propanesultone, in the presence of stoichiometric amounts of a base such as a sodium alcoholate at temperatures ranging from 40° to 80° C. The proportion of additives provided according to the present invention is conveniently from 0.5 to 6%, in particular from 1.4 to 4% molar, based on the dicarboxylic acid moiety of the polyester. These compounds are added to the polyester after preparation of the polyesters. Advantageously, these additives are finely distributed throughout the shaped articles made from the polyester composition.

The compounds of Formula A added to the polyesters in the proportions stated form a clear solution therein as may be observed with the naked eye from the transparency of non-delustered amorphous sheeting prepared from the mixtures. Reprecipitation tests carried out by dissolving the polyethylene terephthalates containing compounds of Formula A in phenol/o-dichlorobenzene and precipitating with methanol show that the compounds of Formula A remain substantially uncombined chemically, with the fiber-forming polyethylene terephthalate molecule. By shaped articles we mean particularly filaments, fibers or films. Shaping of the polyesters containing compounds of Formula A may be carried out by conventional melt-spinning techniques at temperatures of from 260° to 300° C. Both continuous filaments and staple fibers may be made. The filaments or fibers may have a round or profiled, for example a trilobate, cross-section. The mixture of the invention may also be spun together with other fiber-forming polyesters or polyamides to form bi-component filaments in which the components are arranged side-by-side or in which one component forms the core which is surrounded by the other component. The filaments or fibers may also be prepared from sheeting, in which case the polyesters containing compounds of Formula A will be converted to sheeting and then formed into filaments or fibers by mechanical means, for example by cutting or slitting the sheeting.

Filaments or fibers made from the polyesters of the invention have, particularly when drawn, good physical properties and may be processed into the usual textile articles such as woven, nonwoven or knitted materials or carpets. Of particular interest is the high tensile strength of the filaments obtained by melt-spinning the polyethylene terephthalates of the invention, this being in the region of 4.5 to 5.5 g./denier and thus similar to that of filaments made from unmodified polyethylene terephthalates. Substantially no extraction of the compounds of Formula A from the shaped articles takes place in the presence of water, which is a particularly important feature where dyeing is carried out from aqueous baths. The shaped articles of the invention are readily dyed from aqueous dyebaths containing basic dyes such as those having basic tertiary or quaternary nitrogen groups in the molecular.

By employing blends of filaments or fibers of the invention, for example in woven or knitted materials or carpets, with filaments or fibers of unmodified polyethylene terephthalates and/or with basic-dyeable filaments or fibers of polyesters it is possible, by using suitable dyes, if desired in conjunction with acid dyes and/or disperse dyes, to achieve tone-on-tone dyeings, complementary dyeings or cross-dyeings by piece-dyeing techniques.

Other additives such as pigments for example titanium dioxide, stabilizers, optical brighteners or antistatic agents, may also be incorporated in the polyesters or the shaped articles.

EXAMPLE 1,000 g. of dimethyl terephthalates, 735 g. of ethylene glycol, various amounts of modifying components as given in the table below, 0.15 g. of zinc acetate and 0.20 g. of antimony trioxide are melted and stirred for 2 hours whilst the temperature is steadily raised from 160° to 220° C. The methanol liberated is distilled off through a column having a length of 30 cm. and packed with Raschig rings, at a temperature of 68° C. at the top of the column. About 80 ml. of methanol/ethylene glycol are then distilled off through a Liebig condenser before polycondensation is commenced at a temperature of from 260° to 270° C. at a pressure of from 0.3 to 0.4 mm. of Hg for 100 minutes with stirring. The polyesters are formed to granules. Various quantities of sulfonate-group-containing compounds, as given in the table, are then added. After careful mixing and drying, the mixtures are passed through a twin-shaft extruder (Type DSK 28 by Werner and Pfleiderer) at 270° C. and the resulting products are regranulated.

The K values of the polyesters given in the table were determined by the method described by H. Fikentscher in "Cellulosechemie," 13, 58 (1932) in a mixture of phenol/o-dichlorobenzene (3:2) at 25° C. at a concentration of 0.5 g. per 100 ml.

The resulting polyesters are melt-spun at 280° C. (diameter of die 0.3 mm.) and then stretched at a draw ratio of 1:4.5. To test the dye affinity of the filaments they are dyed with a basic dye of the formula:

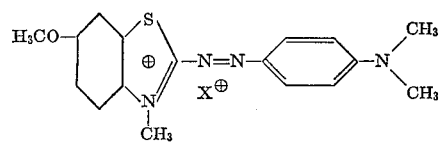

where $X^\ominus$ stands for acetate, at 100° C. for 1 hour from an aqueous dyebath containing 1% of dye at a liquor ratio of 30:1 with the addition of 3 g./l. of Glauber's salt, 30 g./l. of acetic acid and 4 g./l. of a carrier based on o-phenylphenol. The intensities of shade given in the table increase in the following order:

weak—medium—good—intense

The sulfonate-group-containing compounds listed are prepared by reacting the corresponding phenols with stoichiometric amounts of 1,3-propanesultone and the corresponding alkali metal alcoholates at from 40° to 80° C.

The comparative experiments $V_1$ and $V_2$ show that a pure polyethylene terephthalate and polyethylene terephthalate mixed with the reaction product of phenol and 1 mole of 1,3-propane-sultone, as described in U.K. Pat. 1,151,569, show virtually no affinity for basic dyes.

TABLE

| Experiment | modifying component | Sulfonate-group-containing compound (g.) | | K value | Shade intensity of dyeing |
|---|---|---|---|---|---|
| 1 | 71.5 g. dimethyl sebacate | 34.1 | I | 49.5 | Intense. |
| 2 | 57 g. dimethyl adipate | 40.2 | II | 49.0 | Do. |
| 3 | | 34.1 | I | 50.8 | Do. |
| 4 | 32.2 g. neopentyl glycol | 42.1 | III | 48.5 | Good. |
| 5 | | 45 | IV | 51.2 | Intense. |
| $V_1$ | | | | 52.9 | Virtually no dyeing. |
| $V_2$ | | 36.7 | P/PS | 53.2 | Do. |

The Compounds I to IV are of Formula A, in which the symbols have the following values:

| | $x$ | M | R |
|---|---|---|---|
| I | 3 | Na | Methyl- |
| II | 3 | Li | Isobutyl- |
| III | 3 | Na | Cyclohexyl- |
| IV | 3 | Na | β-methoxyethyl. |

In experiment $V_2$, the symbol P/PS stands for the reaction product of phenol and 1,3-propanesultone.

We claim:
1. Filaments or fibers produced by melt-spinning a linear polyethylene terephthalate having admixed therewith after preparation of the polyester from 0.5 to 6% molar of an organic sulfonate-group-containing com- pound, said compound being based on the dicarboxylic acid moiety of the polyethylene terephthalate of the Formula A:

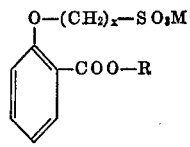

(A)

in which $x$ stands for 3 or 4 and M denotes an alkali metal atom and R stands for straight-chain or branched-chain alkyl of from 1 to 10 carbon atoms optionally substituted by methoxy or ethoxy, or for a cyclohexyl radical.

References Cited

UNITED STATES PATENTS 3,663,508  5/1972  Mobius et al. _____ 260—49

LESTER L. LEE, Primary Examiner

U.S. Cl. X.R.

8—179; 260—37 NP

UNITED STATES PATENT OFFICE
CERTIFICATE OF CORRECTION

Patent No. 3,806,493           Dated April 23, 1974

Inventor(s) Rolf Wurmb et al

It is certified that error appears in the above-identified patent and that said Letters Patent are hereby corrected as shown below:

Column 1, line 12, insert
-- 30  Foreign Application Priority Data
       January 31, 1970  Germany . . .  P 20 04 381.6 --.

Signed and sealed this 29th day of October 1974.

(SEAL)
Attest:

McCOY M. GIBSON JR.                C. MARSHALL DANN
Attesting Officer                  Commissioner of Patents